(No Model.)
G. W. WEISS.
COMBINATION TOOL.
No. 503,182. Patented Aug. 15, 1893.
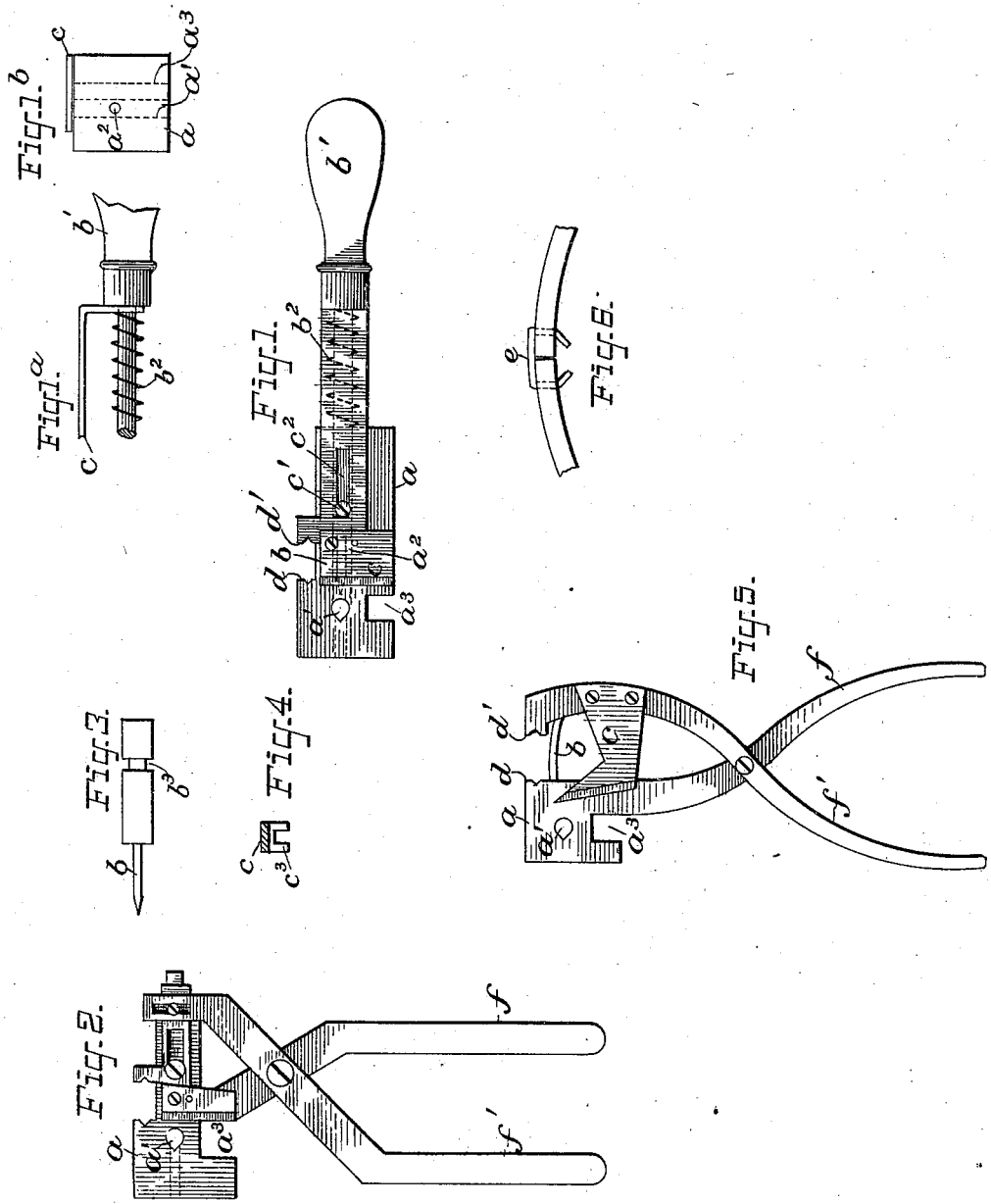
ATTEST:
J. A. Murdly
Annie L. Hayes.
INVENTOR:
George W. Weiss
by Chas. F. Dane
his Atty

UNITED STATES PATENT OFFICE.

GEORGE W. WEISS, OF BROOKLYN, NEW YORK.

COMBINATION-TOOL.

SPECIFICATION forming part of Letters Patent No. 503,182, dated August 15, 1893.

Application filed December 21, 1891. Serial No. 415,715. (No model.)

*To all whom it may concern:*

Be it known that I, GEORGE W. WEISS, a citizen of the United States, and a resident of Brooklyn, in the county of Kings and State of New York, have invented a new and useful Combination-Tool for Cutting and Perforating Belts and Securing the Connecting Hook-Fastening Thereto, of which the following description, taken in connection with the drawings herewith accompanying, is a specification.

My invention relates to a tool or device more especially adapted for use in cutting and perforating the ends of the driving-belts for sewing or other machines and securing the fastening for uniting said ends, and has for its object to provide a tool or device of such character, formed of few parts and of simple construction, which is adapted, first,— for perforating or forming the opening in sewing machine belts adjacent to their ends, for the admission of the wire or similar means usually employed in uniting or securing the ends together, in a manner whereby the said opening may always be in a certain position in the center of the belt and at a specified distance from the end of the same, in order that the fastening device or wire may connect with the ends of the belt at the center of the same and at a point to withstand the greatest strain without liability of its breaking at the point of fastening; and, secondly,—for clamping or securing the wire or similar means employed for connecting the ends of the belt. This object I accomplish by the construction and arrangement of the several parts forming the device as will hereinafter be described in detail and pointed out in the claims.

Referring to the drawings:—Figure 1, represents a plan view of my combination tool. Fig. 1ª, represents a side view of a portion of the same broken away, showing the connection between the operating handle and the shanks of the perforator and the cutter, and Fig. 1ᵇ, represents a bottom or end view of the tool. Fig. 2, represents the tool or device in a modified form. Figs. 3 and 4 represent detail parts of the device shown in Fig. 2. Fig. 5, represents another slightly modified form of constructing the tool, and Fig. 6, illustrates the manner of uniting the ends of the belt, showing the wire or hook fastening in position with its ends ready to be secured.

To explain in detail and referring to Fig. 1, $a$ represents a block or plate, which is provided with an opening $a'$ extending through the same at or near one end thereof, through or into which the end of the belt is adapted to be inserted to be operated upon as will be described, and is provided with another opening $a^2$, (shown in dotted lines) located about central therein, extending at right angles to the former and connecting therewith, in which a perforating or puncturing device $b$ is supported and adapted, when operated, to pass or move across the center of said belt opening $a'$ and through the center of the belt located therein to form an opening for the admission of the wire or hook fastening adapted for connecting the ends of the belt, as shown in Fig 6.

In order that the opening in the belt may always be at the same and proper distance from the end, I have provided a cutting-blade $c$ supported at one side of the block $a$ and adjacent thereto, the shank of which is connected with the shank of the perforator $b$ (as shown in Fig. 1ª) in a manner to be operated in unison therewith to move across or past one end of the belt opening $a'$ and cut off the projecting end of the belt simultaneously with the perforating of the same, thus insuring the proper position of the opening from the end as will be readily understood.

The cutter $c$ is held in position and guided in its movement by a screw $c'$ which extends through a longitudinal slot $c^2$ in the same and into the part $a$, the head of the screw overlapping the sides of the slot $c^2$ as shown.

The perforator and the cutter are adapted to be operated to move across the belt-opening $a'$ by means of a handle $b'$ located on the end of the perforator shank, and are elastically held in a normal position above the belt-opening $a'$ by a coiled spring $b^2$ located on the shank of the perforator and having an outward bearing or pressure against the same and the connecting shank of the cutter, as shown in Fig. 1ª. The block or part $a$ is also provided with an open slot or groove $a^3$ in one side thereof extending parallel with the belt-opening $a'$, across which the cutter $c$ also moves when operated. This open slot or groove is more especially adapted for convenience in cutting the desired lengths of belt from a long piece, by simply slipping the belt, at the point to be cut, into the said open slot or groove $a^3$ and cutting the same, in lieu of drawing the entire length of belt to be cut through the belt-opening $a'$, the advantage of which is obvious.

I have also constructed this device or tool in a manner to be capable of securing the ends of the fastening wire or hook employed for uniting the ends of the belt, after being inserted through the openings or perforations in the latter, by providing a pair of clamping-jaws $d$ and $d'$. The jaw $d$ being formed by a projection or extension located upon one side of the block $a$ and provided with a longitudinal groove or depression in its upper surface, and the other jaw $d'$ formed by an arm which extends at right angles from the shank of the cutter $c$ and parallel with the lower jaw $d$, which arm is also provided with a groove located in its under side or that side adjacent to the lower jaw as shown. After the wire or hook fastening $e$ has been inserted through the openings or perforations in the ends of the belt in a manner as shown in Fig. 6, it is adapted to be placed between the said clamping jaws $d$ and $d'$ and have the projecting ends clamped or bent in close contact with the belt to secure the same, by depressing the upper or movable jaw $d'$ as will be readily understood.

Referring to Fig. 2, I have shown a modified form of operating handle or means for operating the device, which consists of providing the block or plate $a$ with a fixed arm or handle $f$ and pivoting an operating arm or handle $f'$ thereto, which latter is connected with the shank of the cutter $c$ by slot and pin connection as shown, in order to allow for the movement of the connecting end of the handle $f'$ from the line of travel of the cutter and connecting parts as will be readily understood. In this instance, the perforator $b$ is connected with the shank of the cutter $c$ to be operated thereby, by means of an arm $c^3$ projecting from the latter, as shown in Fig. 4, which is bifurcated and adapted to embrace the perforator $b$ or shank thereof in a groove $b^3$ formed therein as shown in Fig. 3.

Referring to Fig. 5, I have shown another and slightly modified form of arranging the several parts forming the device. In this instance, the fixed arm or handle $f$ is formed integral with the block or part $a$, and the perforator $b$ and the cutter $c$ are attached or secured directly to the pivoted operating handle or lever $f'$. The grooved clamping jaw $d'$ is also formed in the end of said handle $f'$. This latter method of arranging the several parts of the device both simplifies and cheapens the cost of manufacturing the same and consequently makes a most desirable way of constructing the device. The lower side of the belt-opening $a'$ is preferably made V-shaped, as shown in the drawings, in order to hold the belt central therein, in case it is of smaller diameter than the latter.

Having thus set forth my invention, I do not wish to be understood as confining myself to the particular form of constructing and arranging the several parts forming the device as shown and described, as it is obvious that various changes and modifications might be made without departing from the spirit of my invention, but What I do claim, and desire to secure by Letters Patent of the United States, is—

1. A belt-cutting device, consisting of a plate or block provided with two substantially parallel openings or grooves therein, as at $a'$ and $a^3$, the cutting blade $c$ adapted to move across said two openings at each operation of the same, and a handle or lever for operating the blade $c$ substantially as described and for the purpose set forth.

2. A belt-cutting and perforating device, consisting of a plate or jaw provided with two substantially parallel openings or grooves therein as at $a'$ and $a^3$, a perforating device or punch for moving across one of said openings, the cutting blade $c$ for moving across or past the ends of said two openings at each operation of the same, and a handle or lever for carrying said perforating device and cutting-blade, substantially as described and for the purpose set forth.

3. A tool or device for perforating belts and securing the hook fastening for connecting the ends of the same, consisting of a supporting plate provided with a belt opening therein, and a second opening or guide-way extending at right angles or nearly so to said belt-opening and connecting therewith, a perforating device located and operating in said guide-way to move across the said belt-opening, a clamping device, consisting of a stationary jaw located or formed upon said supporting plate and a movable jaw adapted to operate in a line with said stationary jaw, and a handle for operating said perforating device and movable clamping jaw, substantially as described and for the purpose set forth.

4. A tool or device for cutting and perforating belts and securing the hook fastening for connecting the ends of the same, consisting of a supporting block or plate provided with a belt-opening therein, a perforating device and a cutting device carried by a movable support or lever and adapted to operate or move across said belt-opening simultaneously, a clamping device consisting of a stationary jaw located on said supporting plate and a movable jaw carried by the said movable support or lever and adapted to move in a line with said stationary jaw, and a suitable handle for operating the said cutting, perforating and clamping devices, substantially as described and for the purpose set forth.

GEORGE W. WEISS.

Witnesses:
CHAS. F. DANE,
ANNIE L. HAYES.